March 28, 1950      J. G. BRAUN      2,501,861
MUSICAL DOLL CRADLE

Filed Feb. 16, 1949      3 Sheets—Sheet 1

INVENTOR
John G. Braun

March 28, 1950   J. G. BRAUN   2,501,861
MUSICAL DOLL CRADLE

Filed Feb. 16, 1949   3 Sheets-Sheet 2

INVENTOR
John G. Braun

ATTYS.

March 28, 1950      J. G. BRAUN      2,501,861
MUSICAL DOLL CRADLE

Filed Feb. 16, 1949      3 Sheets-Sheet 3

INVENTOR
John G. Braun
ATTYS.

Patented Mar. 28, 1950

2,501,861

UNITED STATES PATENT OFFICE 2,501,861

MUSICAL DOLL CRADLE

John G. Braun, Chicago, Ill.

Application February 16, 1949, Serial No. 76,794

4 Claims. (Cl. 84—95)

The invention relates to toys and has more particular reference to a doll cradle incorporating a musical device which is combined with the cradle in a manner to produce music upon rocking of the cradle.

An object of the invention therefore is to provide a doll cradle which will play music when rocked.

Another object is to provide a doll cradle having space in one end member for locating a musical instrument and which is thus hidden from view so that the decorative and pleasing appearance of the cradle is maintained, although sufficient space is provided to permit the instrument to function upon rocking of the cradle.

Another object of the invention is to provide a doll cradle that can be constructed entirely of plastic or similar moldable material, a cradle which will be sturdy but relatively economical to manufacture, and a cradle of improved design incorporating a musical instrument and also incorporating means actuated by the rocking of the cradle for playing said musical instrument.

A further object of the invention is to provide a doll cradle consisting of separable parts that can be easily assembled to form the complete article and wherein each part has a shape that permits formation of the same by plastic forming machines.

With these and other objects in view the invention may consist of certain novel features of construction and operation as will be more fully described and particularly pointed out in the specification, drawings and claims appended hereto.

In the drawings which illustrate an embodiment of the invention and wherein like reference characters are used to designate like parts:

Figure 1:
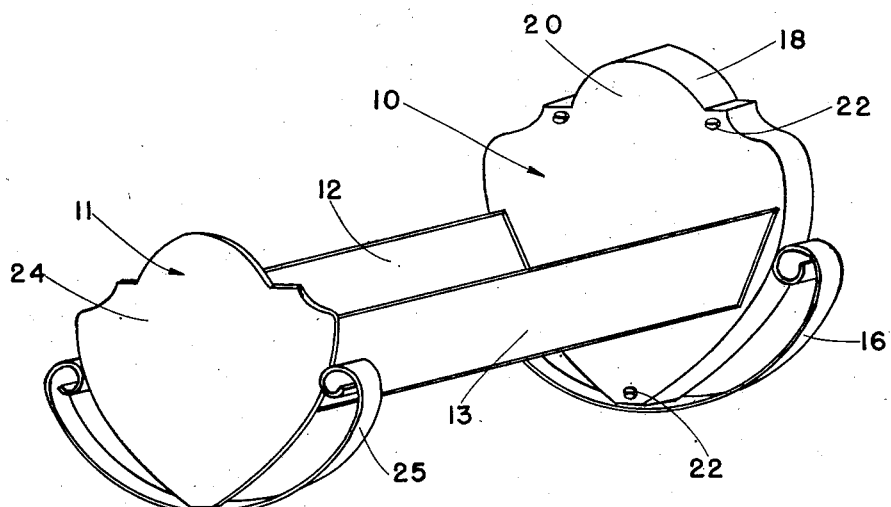
Figure 1 is a perspective view of the doll cradle constructed in accordance with and embodying the improved features of the invention.
Figure 2:
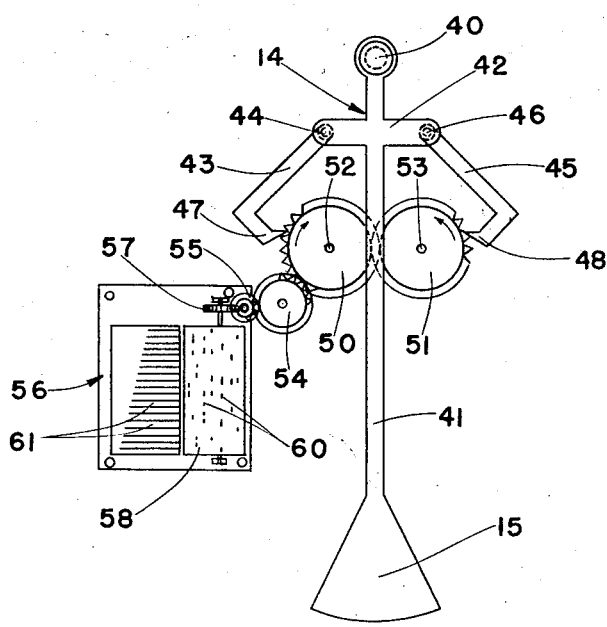
Figure 2 is an elevational view, somewhat enlarged with respect to Figure 1, showing the musical instrument and the actuating means therefor, all of which have location within the cradle according to the invention.
Figure 3:
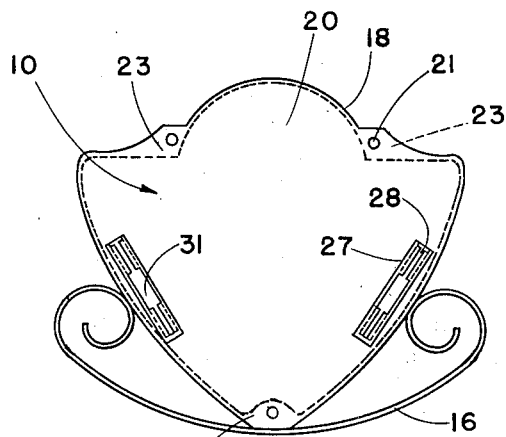
Figure 3 is an elevational view of the head end member of the cradle.
Figure 4:
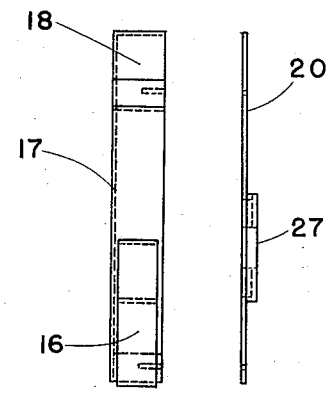
Figure 4 is an end view showing the two parts of said head end member.
Figure 5:
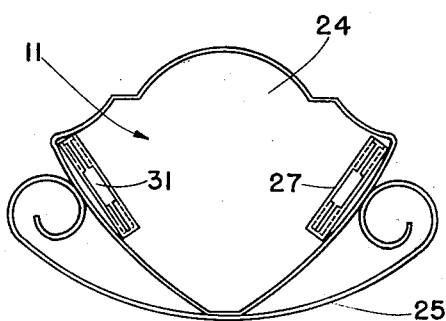
Figure 5 is an elevational view of the other end member.
Figure 6:
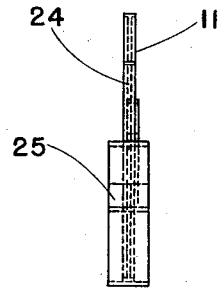
Figure 6 is an end view of the member shown in Figure 5.
Figure 7:
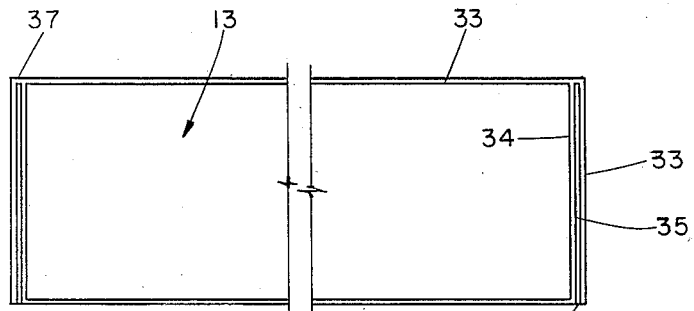
Figure 7 is an elevational view of one of the side panels.
Figure 9:
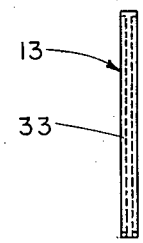
Figure 9 is an end view of the same.
Figure 8:
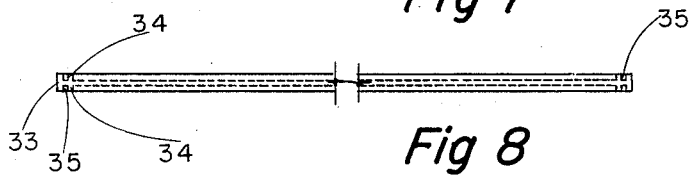
Figure 8 is a top plan view of the side panel.

Referring to the drawings, the cradle selected for illustrating the invention essentially consists of a head end member 10 and a foot end member 11, both having a decorative outline of similar design, as best shown in Figure 1 and in Figures 3 and 5 showing said end members respectively. The said end members are connected in a releasable manner by the side panels 12 and 13 and in accordance with the invention the head end member 10 provides space for the musical instrument shown in Figure 2 and indicated in its entirety by numeral 14. The said instrument is suitably secured to one wall of the head end member with the weight 15 depending so that said weight actuates the instrument upon rocking of the cradle and provides music.

All the parts of the present cradle are designed for production manufacture by plastic forming or molding machines and accordingly the head end member 10 consists of two sections and may consist of three sections in those cases where the runner or rocker 16 is formed as a separate part. The main section of the head end member includes the wall 17 and the flange 18, which flange follows the outline or shape of the wall and is integral with the same. The wall 17 and the flange 18 provide an instrument receiving space and after the device 14 has been located and fixed therein the cover or wall 20 is used to close the space. Said wall 20 is provided with openings 21 for receiving screws 22 which are threaded into wall portions 23 which are integral with the flange 18 merely comprising portions where the flange is thickened. The head end member therefore is hollow, space being provided between walls 17 and 20 for accommodating the musical instrument. The shape of the head end member is of course optional and any desired decorative shape or outline may be selected although that shown in the drawings is typical of the preferred shape since the same has design features and is also functional. The rocker 16 may be formed integral with the flange 18 and wall 17 although as regards certain plastics it may be necessary to form the rocker 16 as a separate element, in which case the rocker is secured to the flange by any suitable means as by a screw, not shown, threaded into the bottom wall portion 23.

Figures 10, 11:
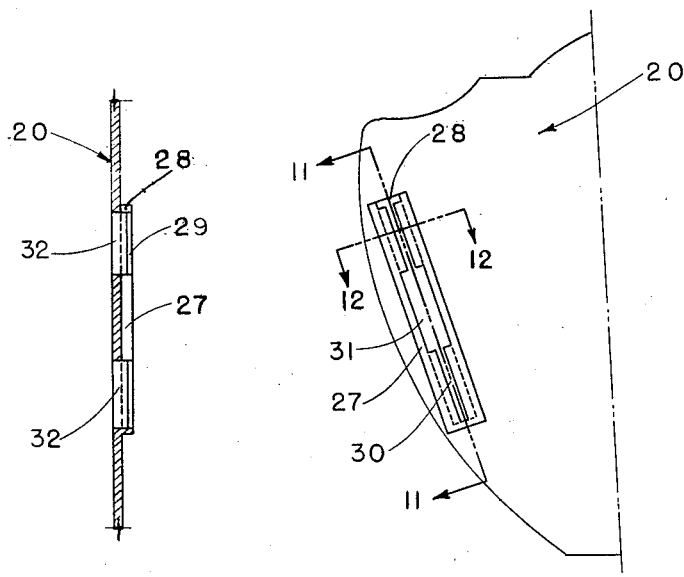
Figure 10 is an enlarged fragmentary elevational view of one of the end members showing details of the attaching means for the side panels.
Figure 11 is a sectional view taken substantially along line 11—11 of Figure 10.
Figure 12:
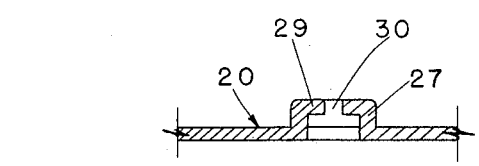
Figure 12 is a sectional view taken substantially along line 12—12 of Figure 10.

The foot end member 11 is very simple in construction and is preferably formed as a single element, the wall 24 being integral with the rocker 25. This end member is similiar in outline to member 10 and rocker 25 is approximately the same in shape and size to rocker 16. Both end members are formed with securing means for releasably attaching the side panels 12 and 13 thereto and said securing means as shown in Figures 10, 11 and 12 will now be described.

The said securing means are formed integral with the head end member 10 and the foot end member 11 and it will be seen that two such securing means are located on each member, being disposed to the respective side edges for receiving the side panels 12 and 13 and which accordingly join the end members together. Since the securing means are similar in construction only one will be described, the same essentially consisting of a rectangular wall 27, open at the top end as at 28 for receiving the grooved end of a side panel either 12 or 13, and being closed at the bottom whereby the securing means functions to retain the side panel in a releasable manner, permitting the same to be withdrawn or lifted through the top opening. The rectangular wall identified by numeral 27 is formed integral with the end member such as 20, Figure 10, and the same includes a top portion 29 longitudinally slotted as at 30. The top portions 29 of the securing means are not continuous for the length of the rectangular wall 27, as will be clearly understood by reference to Figures 10 and 11. Said top portions 29 terminate centrally of the securing means and as a result form the rectangular opening 31. Said rectangular opening is provided with a base, the same comprising wall 26, whereas on each end of said opening 31, the base is eliminated to provide openings 32 which coincide longitudinally with the slots 30. This construction for the securing means has been selected in order to provide means for withdrawing the dies from the plastic when forming the wall member and securing means as an integral unit. It is clear that other interlocking structures or arrangements can be designed for releasably securing the side panels to the end members.

The side panels 12 and 13 are substantially rectangular in shape, being provided with a peripheral rib or flange 33. At the respective ends of each panel the rib or flange 33 has associated therewith complementary ribs 34, one being located on each surface of the panel in spaced relation to the peripheral flange 33. The result of this construction is to provide a groove 35 on each side of the panel and which groove is designed and adapted to receive a top portion 29. In other words, the special formation provided at each end of the side panels is adapted to interlock with the securing means formed on the end members. The opening 28 at the top of the rectangular wall 27 is for the purpose of receiving the special formation at the end of a side panel and for this purpose the grooves 35 are open at the bottom as at 36 and closed at the top as at 37.

In releasably attaching the side panels 12 and 13 to the end members the special formation at one end of the panel is located within the securing means by interfitting the grooves 35 with the top portions 29. In this manner one of the side panels such as 12 is first attached to the head end member and then to the foot end member and then the other panel 13 is simultaneously locked to both end members. This completes the structure of the cradle with the exception of a bottom member or mattress which can be supplied in any form desired.

Before closing the head end member the musical instrument 14 is suitably located and secured within the space provided therefor. The weight 15 depends from the pivot post 40, being formed integral with or otherwise secured to the stem 41. Said stem includes the cross arm piece 42, to each end of which is pivoted an actuating arm, the left arm being indicated by numeral 43 and which arm is pivoted at 44, and the right arm being indicated by numeral 45 and pivoted at 46. The end of arm 43 is formed with an inwardly directed ratchet tooth 47 and in a similar manner arm 45 has an inwardly directed ratchet tooth 48. The ratchet teeth engage the gear teeth on a set of coacting meshing gears which have the same number of teeth and the same pitch diameter. The said gears are indicated by numerals 50 and 51, the same having meshing engagement with each other, and it will be seen that gear 50 is suitably supported for rotation on the pin 52, whereas gear 51 rotates on the pin 53. The rotary movement of the gears 50 and 51 is transmitted to pinion 54 and through said pinion to the worm gear 55, which in turn drives the musical device 56 through gear 57. The musical device is conventional in structure, essentially consisting of a cylinder 58 rotated by rotation of gear 57 and which cylinder is provided with a plurality of projections 60 for actuating the sound producing elements 61.

With the musical instrument as described located within the head end member of the rocker it will be seen that the weight 15 will oscillate as a result of the rocking movement of the cradle. When the weight 15 oscillates in one direction, say to the right, the left arm 43 is caused to engage with the teeth of gear 50 to rotate the gear in a clockwise direction. When the weight 15 oscillates to the left, the right arm 45 is actuated in a similar manner to engage the teeth of gear 51, rotating the gear in a counterclockwise direction. The motion of said gears is transmitted by pinion 54 to the worm gear which in turn rotates the cylinder 58 and music is produced as long as the cradle is rocked.

The cradle of the invention has been designed for production manufacture with the parts being simplified and constructed for ready and easy assembly. The head end member is hollow for the express purpose of providing sufficient space for the musical device which may be fixed to wall 17 or to wall 20. In either case the musical instrument is conveniently housed by the cradle and at the same time the decorative appearance of the cradle is maintained. Music is produced upon rocking of the doll cradle which adds a desirable feature to an article of this nature since it contributes to the pleasure of a child using the same.

The invention is not to be limited to or by details of construction of the particular embodiment thereof illustrated by the drawings as various forms of the device will of course be apparent to those skilled in the art without departing from the spirit of the invention or the scope of the claims.

What is claimed is:

1. In a cradle, in combination, a head end member having a decorative outline, being substantially hollow within and including a wall member for releasably closing said interior space, a foot end member also of decorative outline, means releasably fastened to the end members for connecting the same in spaced parallel relation, a rocker fixed to each end member for supporting the same for rocking movement, and a weight actuated musical instrument supported by the head end member within the said space provided thereby.

2. In a doll cradle adapted to be rocked, in combination, a head end member including spaced wall members joined by a peripheral flange, one of said wall members being releasable to permit access to the space within, a foot end member, means releasably fastened to the end members for connecting the same in spaced parallel relation, a rocker fixed to each end member for supporting the same for rocking movement, and a weight actuated musical instrument supported by the head end member within the space provided thereby, whereby the instrument produces music as a result of rocking of the cradle.

3. In a doll cradle adapted to be rocked, in combination, a head end member including spaced wall members joined by a peripheral flange, one of said wall members being releasable to permit access to the space within, a foot end member, said end members having a decorative outline, side panels releasably fixed to each end member for connecting the members in spaced parallel relation, a musical instrument supported by the head end member within the space provided thereby, a weight also supported by said head end member within the said space in a manner to permit back and forth movement upon rocking of the cradle, and means operative upon movement of the weight to effect actuation of the musical instrument.

4. In a doll cradle adapted to be rocked, in combination, a head end member including spaced wall members joined by a peripheral flange, one of said wall members being releasable to permit access to the space within, a foot end member, side panels connecting the end members in spaced parallel relation, said panels and end members having means formed integral therewith respectively adapted to releasably interengage for fastening the panels to the end members, a musical instrument supported by the head end member within the space provided thereby, a weight also supported by said head end member within the said space in a manner to permit back and forth movement upon rocking of the cradle, and means operative upon movement of the weight to effect actuation of the musical instrument.

JOHN G. BRAUN.

REFERENCES CITED

The following references are of record in the file of this patent:

UNITED STATES PATENTS

| Number | Name | Date |
| --- | --- | --- |
| 236,545 | Brown | Jan. 11, 1881 |
| 621,061 | Gay | Mar. 14, 1899 |
| 2,252,290 | Konikoff | Aug. 12, 1941 |